(12) United States Patent
Ramalingam et al.

(10) Patent No.: US 10,254,977 B2
(45) Date of Patent: Apr. 9, 2019

(54) ACHIEVING CONSISTENT READ TIMES IN MULTI-LEVEL NON-VOLATILE MEMORY

(71) Applicant: Intel Corporation, Santa Clara, CA (US)

(72) Inventors: Anand S. Ramalingam, Beaverton, OR (US); Pranav Kalavade, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/803,107

(22) Filed: Nov. 3, 2017

(65) Prior Publication Data

US 2018/0188978 A1    Jul. 5, 2018

Related U.S. Application Data

(63) Continuation of application No. 15/395,062, filed on Dec. 30, 2016, now Pat. No. 9,811,269.

(51) Int. Cl.
| | |
|---|---|
| *G11C 7/00* | (2006.01) |
| *G06F 3/06* | (2006.01) |
| *G06F 12/02* | (2006.01) |

(52) U.S. Cl.
CPC .......... *G06F 3/0613* (2013.01); *G06F 3/0652* (2013.01); *G06F 3/0656* (2013.01); *G06F 3/0658* (2013.01); *G06F 3/0679* (2013.01); *G06F 12/0246* (2013.01); *G06F 12/0292* (2013.01); *G06F 2212/1016* (2013.01); *G06F 2212/2022* (2013.01); *G06F 2212/7204* (2013.01); *G06F 2212/7205* (2013.01)

(58) Field of Classification Search
CPC .......... G11C 7/22; G11C 7/078; G11C 7/1006
USPC .......... 365/189.16, 189.14, 189.07
See application file for complete search history.

(56) References Cited

U.S. PATENT DOCUMENTS

| | | | |
|---|---|---|---|
| 7,966,550 B2 | 6/2011 | Mokhlesi et al. | |
| 9,811,269 B1* | 11/2017 | Ramalingam | ....... G06F 12/0253 |
| 2006/0221696 A1 | 10/2006 | Li | |
| 2011/0280068 A1* | 11/2011 | Patapoutian | ........ G11C 11/5628 |
| | | | 365/185.03 |
| 2012/0155166 A1 | 6/2012 | Li | |
| 2013/0128665 A1 | 5/2013 | Mokhlesi et al. | |
| 2014/0173382 A1 | 6/2014 | Yang et al. | |
| 2016/0098197 A1 | 4/2016 | Kuo et al. | |

OTHER PUBLICATIONS

Notice of Allowance for U.S. Appl. No. 15/395,062, dated Jun. 27, 2017, 9 pages.
International Search Report and Written Opinion for International Patent Application No. PCT/US2017/061996, dated Mar. 15, 2018, 13 pages.

* cited by examiner

*Primary Examiner* — Son Dinh
(74) *Attorney, Agent, or Firm* — Jordan IP Law, LLC

(57) ABSTRACT

Systems, apparatuses and methods may provide for technology that reads a lower page, one or more intermediate pages and a last page from a set of multi-level non-volatile memory (NVM) cells, wherein one or more of a lower read time associated with the lower page or a last read time associated with the last page is substantially similar to an intermediate read time associated with the one or more intermediate pages.

25 Claims, 3 Drawing Sheets

ACHIEVING CONSISTENT READ TIMES IN MULTI-LEVEL NON-VOLATILE MEMORY

CROSS-REFERENCE WITH RELATED APPLICATIONS

The present application claims the benefit of priority to U.S. Non-Provisional patent application Ser. No. 15/395,062 filed on Dec. 30, 2016.

TECHNICAL FIELD

Embodiments generally relate to memory structures.

BACKGROUND

Multi-level NAND-type flash memory ("NAND memory") may be organized into multiple cells, with each cell containing multiple bits of data. In such a case, the number of bits per cell may depend on how many distinct voltage levels can be achieved during program operation(s). For example, to support two bits per cell, four voltage levels may be called for in order to distinguish between the four possible combinations of ones and zeros (11, 01, 00, 10). Each bit may have a substantially different read time due to the number of voltage level comparisons that are conducted for the bit in question. For example, in the above example, two comparisons may be involved for the first (e.g., most significant) bit in order to read the bit, whereas only one comparison may be involved for the second (e.g., least significant) bit. Accordingly, reading the second bit may take twice as long as reading the first bit.

This variability may present challenges with regard to the device (e.g., solid state drive/SSD) containing the multi-level NAND memory as well as the system (e.g., server, host, data center) containing the device. For example, the SSD may use a transfer buffer to store data that is being relocated in accordance with a "garbage collection" policy. Designing the transfer buffer to support the longest read times may increase the size of the transfer buffer, which may in turn have a negative impact on performance and cost. Similarly, server resources such as multi-threading read queues within the host processor may be sized to support the longest read times, which may further reduce performance and increase cost.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

A multi-level non-volatile memory (NVM) such as, for example, NAND memory may be organized into multiple cells, with each cell containing multiple bits of data. In order to distinguish between the possible bit combinations, various voltage levels may be used. For example, two bits per cell might be programmed and read according to Table I below.

TABLE I

|  | Bit 1 | Bit 2 |
| --- | --- | --- |
| Level 1 (750 mV) | 1 | 1 |
| Level 2 (500 mV) | 0 | 1 |
| Level 3 (250 mV) | 0 | 0 |
| Level 4 (0 mV) | 1 | 0 |

In the above example, a read of Bit 1 may involve determining (e.g., via voltage comparators) whether the corresponding gate in the memory cell conducts at Level 3 (250 mV) and whether the corresponding gate conducts at Level 1 (750 mV). By contrast, a read of Bit 2 may only involve determining whether the corresponding gate in the memory cell conducts at Level 2 (500 mV). The values provided herein are to facilitate discussion only and may vary depending on the circumstances. Due to the multiple determinations associated with Bit 1, reading Bit 1 may generally take twice as long as reading Bit 2. As the number of bits per cell increases (e.g., to tri-level cell/TLC architectures, quad level cell/QLC architectures, etc.), the read time inconsistency may present a number of challenges with respect to garbage collection, multi-threaded operation, and so forth. As will be discussed in greater detail, an enhanced encoding scheme may be used to achieve consistent read times in multi-level NVM structures.

Figure 1:
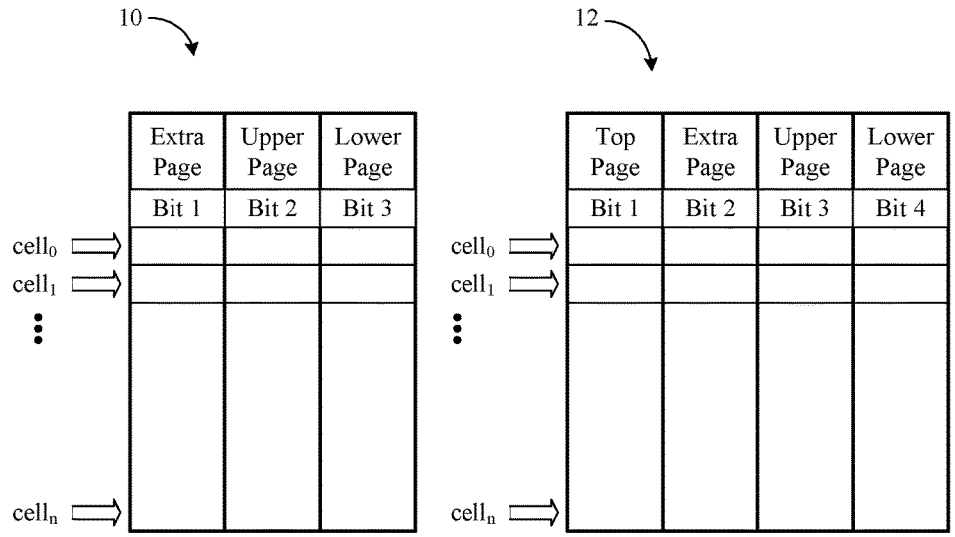
FIG. 1 is an illustration of an example of a tri-level cell (TLC) architecture and a quad level cell (QLC) architecture according to an embodiment.

Turning now to FIG. 1, examples of a TLC architecture 10 and a QLC architecture 12 are shown. The illustrated TLC architecture 10 includes a set of multi-level NVM cells (cell$_0$, cell$_1$, ..., cell$_n$), wherein each cell includes three bits (Bit 1, Bit 2, Bit 3). The cells may be programmed (e.g., written to) and read on a page-by-page basis, with each page corresponding to a particular bit. More particularly, a lower page (LP) may correspond to Bit 3, an upper page (UP, e.g., intermediate page) may correspond to Bit 2 and an extra page (XP) may correspond to Bit 1. Additionally, each bit may be individually programmed to a certain voltage level, wherein the total number of voltage levels (e.g., eight in this case) enable all possible bit combinations to be distinguished from one another.

Similarly, the QLC architecture 12 includes a set of multi-level NVM cells (cell$_0$, cell$_1$, ..., cell$_n$), wherein each cell includes four bits (Bit 1, Bit 2, Bit 3, Bit 4). The cells may be programmed (e.g., written to) and read on a page-by-page basis, with each page corresponding to a particular bit. More particularly, a lower page (LP) may correspond to Bit 4, an upper page (UP, e.g., intermediate page) may correspond to Bit 3, an extra page (XP, e.g., intermediate page) may correspond to Bit 2 and a top page (TP) may correspond to Bit 1. Each bit may be individually programmed to a certain voltage level, wherein the total number of voltage levels (e.g., sixteen in this case) enable all possible bit combinations to be distinguished from one another.

The multi-level NVM cells may be used for a NAND flash memory, three-dimensional (3D) NAND memory array devices, or other memory devices. Non-volatile memory is a storage medium that does not require power to maintain the state of data stored by the medium. Non-limiting examples of non-volatile memory may include any or a combination of: solid state memory (such as planar or 3D NAND flash memory or NOR flash memory), 3D crosspoint memory, storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Figure 2:
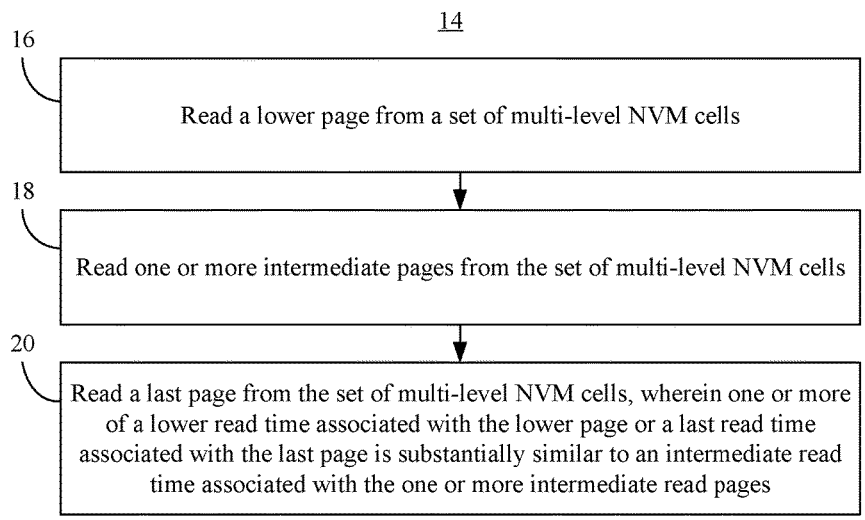
FIG. 2 is a flowchart of an example of a method of operating a chip controller apparatus according to an embodiment.

FIG. 2 shows a method 14 of operating a chip controller apparatus. The method 14 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

Illustrated processing block 16 provides for reading a lower page from a set of multi-level NVM cells, wherein one or more intermediate pages may be read from the set of multi-level NVM cells at block 18. Block 18 may include reading an upper page (e.g., in a TLC or QLC architecture) or reading an extra page (e.g., in a QLC architecture). Additionally, block 20 may read a last page from the set of multi-level NVM cells, wherein one or more of a lower read time associated with the lower page or a last read time associated with the last page is substantially similar to an intermediate read time associated with the one or more intermediate pages. The substantially similar read times may generally be achieved by increasing the lower page read time and decreasing the last page read time so that they are closer to one another. For example, the cell encoding scheme might be modified so that reading the lower page includes conducting multiple comparisons between read levels and determining bit values of the lower page based on the multiple comparisons. The order in which the blocks 16, 18 and 20 are conducted may vary depending on the circumstances (e.g., where requested data is located in the NVM cells).

Figure 3:
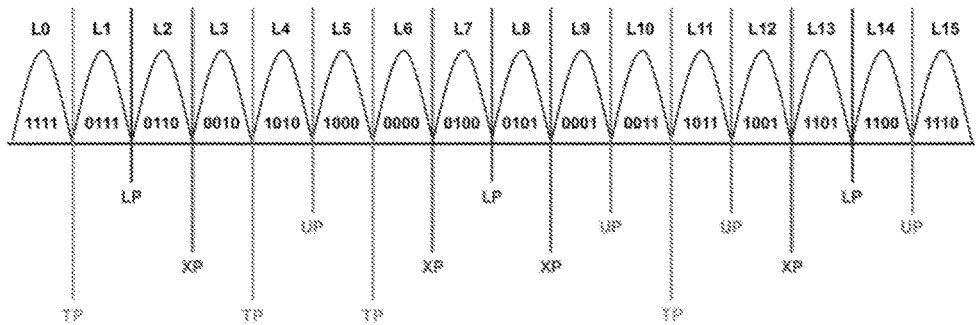
FIGS. 3 and 4 are illustrations of examples of QLC encoding schemes according to embodiments.

More particularly, FIG. 3 shows one encoding scheme 22 in which the lower page (LP, e.g., Bit 4) is read at three voltage levels—L2 (e.g., read level two/rL2), L8 (e.g., read level eight/rL8) and L14 (e.g., read level fourteen/rL14). The upper page (UP, intermediate page, e.g., Bit 3) may be read at four voltage levels—L5 (e.g., read level five/rL5), L10 (e.g., read level ten/rL10), L12 (e.g., read level twelve/rL12) and L15 (e.g., read level fifteen/rL15). Thus, the lower read time is substantially similar to the intermediate read time to the extent that it only involves one less voltage level comparison than the intermediate read time, in the illustrated example.

Similarly, the extra page (XP, intermediate page, e.g., Bit 2) may also be read at four voltage levels—L3 (e.g., read level three/rL3), L7 (e.g., read level seven/rL7), L9 (e.g., read level nine/rL9) and L13 (e.g., read level thirteen/rL13). The illustrated scheme 22 also reads the top page (TP, e.g., Bit 1) at four voltage levels—L1 (e.g., read level one/rL1), L4 (e.g., read level four/rL4), L6 (e.g., read level six/rL6) and L11 (e.g., read level eleven/rL11).

Accordingly, the scheme 22 may read all pages in nearly the same amount of time. Such a solution enables other system components to be designed for a less severe worst case scenario (e.g., four comparisons rather than eight if the last page read time were not decreased, at the expense of increasing the lower page read time).

Figure 4:
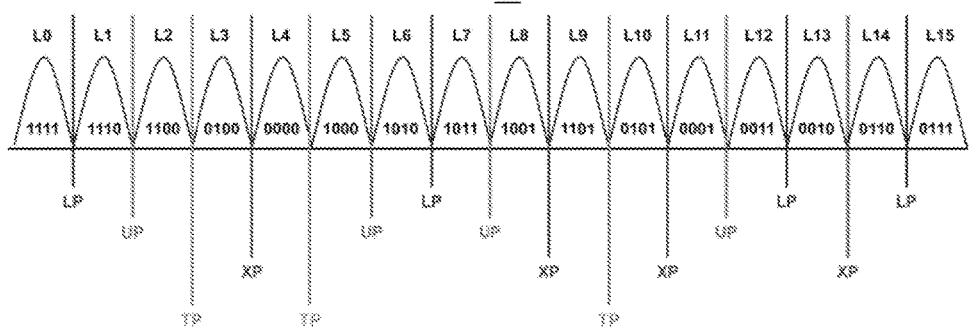

FIG. 4 shows another encoding scheme in which the lower page (LP, e.g., Bit 4) is read at four voltage levels—L1 (e.g., read level one/rL1), L7 (e.g., read level seven/rL7), L13 (e.g., read level thirteen/rL13) and L15 (e.g., read level fifteen/rL15). The upper page (UP, intermediate page, e.g., Bit 3) may also be read at four voltage levels—L2 (e.g., read level two/rL2), L6 (e.g., read level six/rL6), L8 (e.g., read level eight/rL8) and L12 (e.g., read level twelve/rL12). Thus, the lower read time is essentially equal to the intermediate read time to the extent that they both involve same number of voltage level comparisons (e.g., the only time difference may be attributable to comparator and/or transmission line physics).

Similarly, the extra page (XP, intermediate page, e.g., Bit 2) may also be read at four voltage levels—L4 (e.g., read level four/rL4), L9 (e.g., read level nine/rL9), L11 (e.g., read level eleven/rL11) and L14 (e.g., read level fourteen/rL14). The illustrated scheme 22 also reads the top page (TP, e.g., Bit 1) at three voltage levels—L3 (e.g., read level three/rL3), L5 (e.g., read level five/rL5) and L10 (e.g., read level ten/rL10).

Accordingly, the scheme 24 may read all pages in nearly the same amount of time. Such a solution enables other system components to be designed for a less severe worst case scenario (e.g., four comparisons rather than eight if the last page read time were not decreased, at the expense of increasing the lower page read time).

Figure 5:
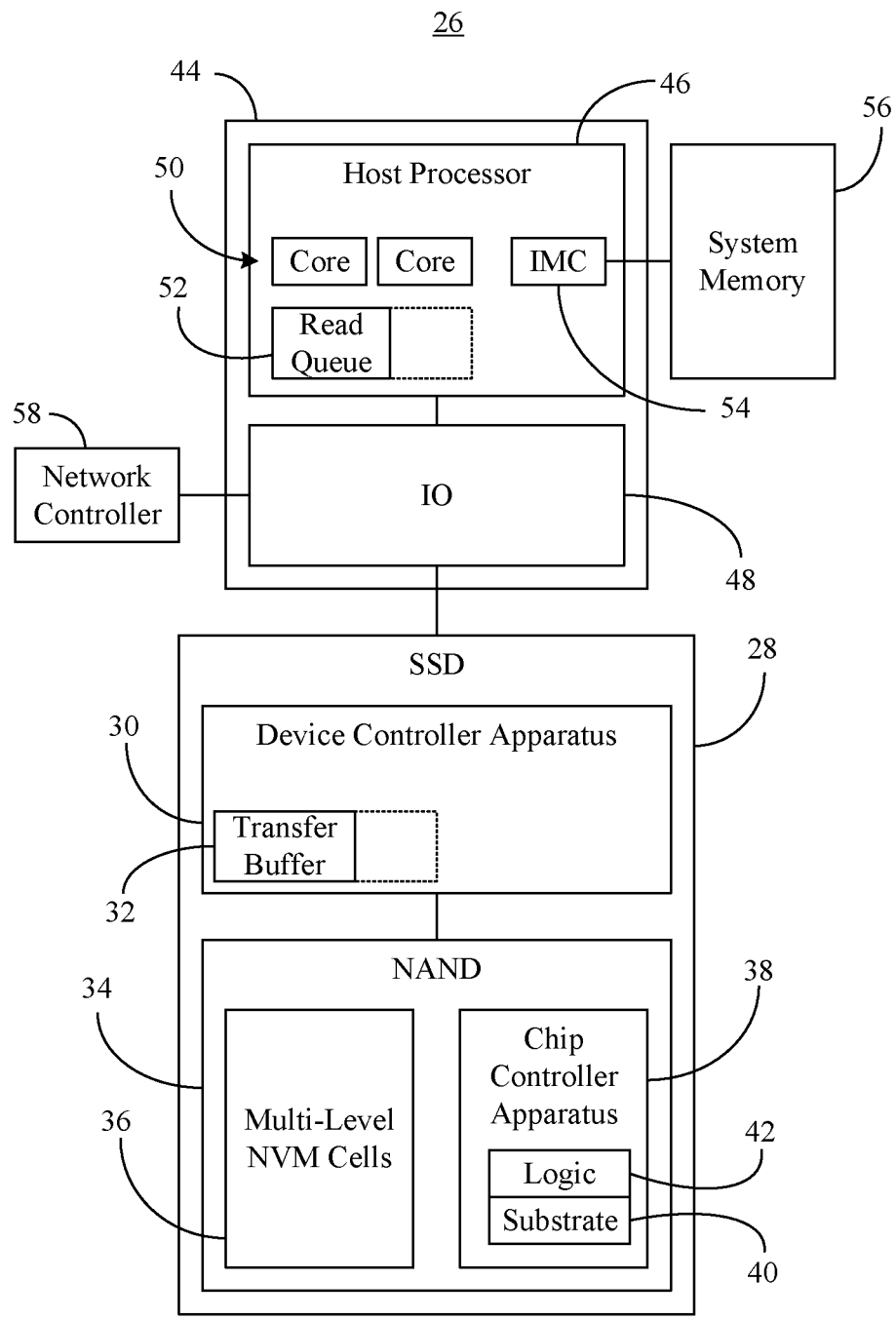
FIG. 5 is a block diagram of an example of a computing system according to an embodiment.

Turning now to FIG. 5, a consistency-enhanced computing system 26 is shown. In the illustrated example, a solid state drive (SSD) 28 includes a device controller apparatus 30 having a transfer buffer 32 that is used to store garbage collection data during the transfer of the data between different locations in a NAND 34. The illustrated NAND 34 includes a set of multi-level NVM cells 36 and a chip controller apparatus 38 that includes a substrate 40 (e.g., silicon, sapphire, gallium arsenide) and logic 42 (e.g., transistor array and other integrated circuit/IC components) coupled to the substrate 40. The logic 42, which may include fixed-functionality hardware, may be configured to perform one or more aspects of the method 14 (FIG. 2), already discussed.

More particularly, the logic 42 may read a lower page, one or more intermediate pages and/or a last page from the set of multi-level NVM cells 36, wherein one or more of a read time associated with the lower page or a last read time associated with the last page is to be substantially similar to an intermediate read time associated with the one or more intermediate pages. Accordingly, the garbage collection activities of the device controller apparatus 30 may require less space in the transfer buffer 32.

In general, the levels mentioned above may be set during programming of the NAND cell. In one example, one bit is programmed at a time to retain the traditional hard disk like behavior for SSDs. Additionally, all four bits (for QLC) of information may be passed to the NAND 34 per program operation. As a consequence, increased buffering may be involved inside the SSD 28 prior to issuing the program command to the NAND 34. A side effect of finely programming each voltage level within a tight distribution may also be increased buffering inside the SSD 28 (due to longer program time/$T_{prog}$), which is unrelated to the encoding scheme(s) described herein. Since the tight distribution used per level may increase the buffering inside the SSD 28, leading to DRAM based data buffering in addition to the transfer buffer 32, the technology described herein may "piggy back" on the same scheme with a modest increase to the DRAM buffer size. Commercially available DRAM used in SSDs may come in 100s of Megabytes, whereas the increased DRAM buffer size may be on the order of 10s of MBs (i.e., not a cost adder for data center SSD configurations that employ DRAM anyway and often have unused DRAM capacity).

The illustrated system 26 also includes a system on chip (SoC) 44 having a host processor 46 (e.g., central processing unit/CPU) and an input/output (IO) module 48. The host processor 46 may include a plurality of cores 50, a read queue 52 and an integrated memory controller 54 (IMC) that communicates with system memory 56. The illustrated IO module 48 is coupled to the SSD 28 as well as other system components such as a network controller 58. In one example, the host processor 46 is agnostic to the encoding scheme used by the chip controller apparatus 38.

As already noted, the average read times may be the same for all encoding schemes. The read bandwidth varies depending on the duration of the read time ($T_{read}$). Software applications running on the host processor 46 may have fewer threads—e.g., no more than the number of cores 50 available—to minimize the overhead of thread context switches. The technology described herein may enable host interface bandwidth saturation to be achieved for read operations with fewer threads at the host level, resulting in much better performance at the application level. In addition, because data center applications may size resources for the slowest $T_{read}$, the technology described herein may reduce the host resources required as the worst case $T_{read}$ may be half of the traditional encoding scheme.

ADDITIONAL NOTES AND EXAMPLES

Example 1 may include a solid state drive system comprising a device controller apparatus including a transfer buffer, a non-volatile memory (NVM) communicatively coupled to the device controller apparatus, the NVM including a set of multi-level NVM cells and a chip controller that includes a substrate and logic, implemented in fixed-functionality hardware and coupled to the substrate, the logic to read a lower page from the set of multi-level NVM cells, read one or more intermediate pages from the set of multi-level NVM cells and read a last page from the set of multi-level NVM cells, wherein one or more of a lower read time associated with the lower page or a last read time associated with the last page is to be substantially similar to an intermediate read time associated with the one or more intermediate pages.

Example 2 may include the system of Example 1, wherein the logic is to conduct multiple comparisons between read levels, and determine bit values of the lower page based on the multiple comparisons to read the lower page.

Example 3 may include the system of Example 2, wherein the multiple comparisons are to be conducted between three read levels.

Example 4 may include the system of Example 2, wherein the multiple comparisons are to be conducted between four read levels.

Example 5 may include the system of any one of Examples 1 to 4, wherein the logic is to read an upper page to read the one or more intermediate pages, and wherein the intermediate read time is to be associated with the upper page.

Example 6 may include the system of any one of Examples 1 to 4, wherein the logic is to read an extra page to read the one or more intermediate pages, and wherein the intermediate read time is to be associated with the extra page.

Example 7 may include the system of Example 1, wherein the set of multi-level NVM cells includes a quad level cell architecture.

Example 8 may include the system of Example 1, wherein the set of multi-level NVM cells includes a tri-level cell architecture.

Example 9 may include the system of Example 1, wherein the device controller is to store garbage collection data from the lower page, the one or more intermediate pages and the last page to the transfer buffer, and write the garbage collection data to different locations in the set of multi-level NVM cells.

Example 10 may include a chip controller apparatus comprising a substrate, and logic, implemented in fixed-functionality hardware and coupled to the substrate, the logic to read a lower page from a set of multi-level non-volatile memory (NVM) cells, read one or more intermediate pages from the set of multi-level NVM cells, and read a last page from the set of multi-level NVM cells, wherein one or more of a lower read time associated with the lower page or a last read time associated with the last page is to be substantially similar to an intermediate read time associated with the one or more intermediate pages.

Example 11 may include the apparatus of Example 10, wherein the logic is to conduct multiple comparisons between read levels, and determine bit values of the lower page based on the multiple comparisons to read the lower page.

Example 12 may include the apparatus of Example 11, wherein the multiple comparisons are to be conducted between three read levels.

Example 13 may include the apparatus of Example 11, wherein the multiple comparisons are to be conducted between four read levels.

Example 14 may include the apparatus of any one of Examples 10 to 13, wherein the logic is to read an upper page to read the one or more intermediate pages, and wherein the intermediate read time is to be associated with the upper page.

Example 15 may include the apparatus of any one of Examples 10 to 13, wherein the logic is to read an extra page to read the one or more intermediate pages, and wherein the intermediate read time is to be associated with the extra page.

Example 16 may include the apparatus of Example 10, wherein the set of multi-level NVM cells is to include a quad level cell architecture.

Example 17 may include the apparatus of Example 10, wherein the set of multi-level NVM cells is to include a tri-level cell architecture.

Example 18 may include a method of operating a chip controller apparatus, comprising reading a lower page from a set of multi-level non-volatile memory (NVM) cells, reading one or more intermediate pages from the set of multi-level NVM cells, and reading a last page from the set of multi-level NVM cells, wherein one or more of a lower read time associated with the lower page or a last read time associated with the last page is substantially similar to an intermediate read time associated with the one or more intermediate pages.

Example 19 may include the method of Example 18, wherein reading the lower page includes conducting multiple comparisons between read levels, and determining bit values of the lower page based on the multiple comparisons.

Example 20 may include the method of Example 19, wherein conducting the multiple comparisons includes conducting comparisons between three read levels.

Example 21 may include the method of Example 19, wherein conducting the multiple comparisons includes conducting comparisons between four read levels.

Example 22 may include the method of any one of Examples 18 to 21, wherein reading the one or more intermediate pages includes reading an upper page, wherein the intermediate read time is associated with the upper page.

Example 23 may include the method of any one of Examples 18 to 21, wherein reading the one or more intermediate pages includes reading an extra page, wherein the intermediate read time is associated with the extra page.

Example 24 may include the method of Example 18, wherein the set of multi-level NVM cells includes a quad level cell architecture.

Example 25 may include the method of Example 18, wherein the set of multi-level NVM cells includes a tri-level cell architecture.

Example 26 may include a chip controller apparatus comprising means for reading a lower page from a set of multi-level non-volatile memory (NVM) cells, means for reading one or more intermediate pages from the set of multi-level NVM cells, and means for reading a last page from the set of multi-level NVM cells, wherein one or more of a lower read time associated with the lower page or a last read time associated with the last page is to be substantially similar to an intermediate read time associated with the one or more intermediate pages.

Example 27 may include the apparatus of Example 26, wherein the means for reading the lower page includes means for conducting multiple comparisons between read levels, and means for determining bit values of the lower page based on the multiple comparisons.

Example 28 may include the apparatus of Example 27, wherein the means for conducting the multiple comparisons includes means for conducting comparisons between three read levels.

Example 29 may include the apparatus of Example 27, wherein the means for conducting the multiple comparisons includes means for conducting comparisons between four read levels.

Example 30 may include the apparatus of any one of Examples 26 to 29, wherein the means for reading the one or more intermediate pages includes means for reading an upper page, wherein the intermediate read time is to be associated with the upper page.

Example 31 may include the apparatus of any one of Examples 26 to 29, wherein the means for reading the one or more intermediate pages includes means for reading an extra page, wherein the intermediate read time is to be associated with the extra page.

Example 32 may include the apparatus of Example 26, wherein the set of multi-level NVM cells is to include a quad level cell architecture.

Example 33 may include the apparatus of Example 26, wherein the set of multi-level NVM cells is to include a tri-level cell architecture.

Technology described herein may therefore map target read times to the voltage level bins available in multi-bits per cell such that it takes approximately the same amount of time to read a bit in the cell regardless of how many bits per cell are present. The technology may also create features in NAND memory that are optimized for SSD usage. For example, the NAND memory may have an encoding scheme that delivers better consistency and uniformity of IO operations. Additionally, reducing the size of the comparison circuitry may lead to significant space savings due to the ability to position the comparison circuitry under the NAND cell array in a three-dimensional (3D) architecture (e.g., CMOS under array/CUA). Moreover, since uniformity of write IO operations per second (IOPS) may be dominated by the rate at which garbage collection is reclaiming free space inside the SSD, the technology described herein may deliver better write uniformity with lower cost. Indeed, having consistent read times may help size resources across the operating system (OS) stack, which may be particularly beneficial to data center/enterprise use cases in which data updates are frequent and less predictable.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a device controller apparatus including a transfer buffer; and
a non-volatile memory (NVM) communicatively coupled to the device controller apparatus, the NVM including:
a set of multi-level NVM cells, wherein each of the multi-level NVM cells includes at least four bits; and
a chip controller apparatus that includes one or more substrates and logic, implemented in fixed-functionality hardware and coupled to the one or more substrates, the logic to program the set of multi-level NVM cells and read one or more pages from the set of multi-level NVM cells.

2. The system of claim 1, wherein the logic is to:
read one or more of a lower page from the set of multi-level NVM cells or a top page from the set of multi-level NVM cells; and
read one or more of an extra page from the set of multi-level NVM cells or an upper page from the set of multi-level NVM cells;
wherein one or more of a lower read time associated with the lower page or a top read time associated with the top page is to be substantially similar to one or more of an extra page read time associated with the extra page or an upper page read time associated with the upper page.

3. The system of claim 2, wherein the logic is to:
conduct multiple comparisons between read levels, and
determine bit values of the lower page based on the multiple comparisons to read the lower page.

4. The system of claim 3, wherein the multiple comparisons are to be conducted between three read levels.

5. The system of claim 3, wherein the multiple comparisons are to be conducted between four read levels.

6. The system of claim 2, wherein the logic is to read the upper page and the top page, and wherein the top read time is substantially similar to the upper page read time.

7. The system of claim 2, wherein the logic is to read the lower page and the extra page, and wherein the lower read time is substantially similar to the extra page read time.

8. The system of claim 1, wherein the set of multi-level NVM cells includes a quad level cell architecture.

9. The system of claim 1, wherein the device controller apparatus is to store garbage collection data from a lower page, one or more intermediate pages and a last page to the transfer buffer, and write the garbage collection data to different locations in the set of multi-level NVM cells.

10. An apparatus comprising:
one or more substrates; and
logic, implemented in fixed-functionality hardware and coupled to the one or more substrates, the logic to:
read one or more pages from a set of multi-level non-volatile memory (NVM) cells, wherein each of the multi-level NVM cells includes at least four bits, and program the multi-level NVM cells.

11. The apparatus of claim 10, wherein the logic is to:
read one or more of a lower page from the set of multi-level NVM cells or a top page from the set of multi-level NVM cells; and
read one or more of an extra page from the set of multi-level NVM cells or an upper page from the set of multi-level NVM cells;
wherein one or more of a lower read time associated with the lower page or a top read time associated with the top page is to be substantially similar to one or more of an extra page read time associated with the extra page or an upper page read time associated with the upper page.

12. The apparatus of claim 11, wherein the logic is to:
conduct multiple comparisons between read levels, and
determine bit values of the lower page based on the multiple comparisons to read the lower page.

13. The apparatus of claim 12, wherein the multiple comparisons are to be conducted between three read levels.

14. The apparatus of claim 12, wherein the multiple comparisons are to be conducted between four read levels.

15. The apparatus of claim 11, wherein the logic is to read the upper page and the top page, and
wherein the top read time is substantially similar to the upper page read time.

16. The apparatus of claim 11, wherein the logic is to read the lower page and the extra page, and
wherein the lower read time is substantially similar to the extra page read time.

17. The apparatus of claim 10, wherein the set of multi-level NVM cells is to include a quad level cell architecture.

18. A method comprising:
reading, by logic implemented in fixed-functionality hardware, one or more pages from a set of multi-level non-volatile memory (NVM) cells, wherein each of the multi-level NVM cells includes at least four bits; and
programming, with the logic, the multi-level NVM cells.

19. The method of claim 18, wherein the reading comprises:
reading one or more of a lower page from the set of multi-level NVM cells or a top page from the set of multi-level NVM cells; and
reading one or more of an extra page from the set of multi-level NVM cells or an upper page from the set of multi-level NVM cells;
wherein one or more of a lower read time associated with the lower page or a top read time associated with the top page is to be substantially similar to one or more of an extra page read time associated with the extra page or an upper page read time associated with the upper page.

20. The method of claim 19, wherein the reading the one or more of the lower page or the top page includes reading the lower page by:
conducting multiple comparisons between read levels; and determining bit values of the lower page based on the multiple comparisons.

21. The method of claim 20, wherein the conducting the multiple comparisons includes conducting comparisons between three read levels.

22. The method of claim 20, wherein the conducting the multiple comparisons includes conducting comparisons between four read levels.

23. The method of claim 19, wherein:
the reading the one or more of the lower page or the top page includes reading the top page;
the reading the one or more of the extra page or the upper page includes reading the upper page; and
wherein the top read time is substantially similar to the upper page read time.

24. The method of claim 19, wherein
the reading the one or more of the lower page or the top page includes reading the lower page;
the reading the one or more of the extra page or the upper page includes reading the extra page; and
wherein the lower read time is substantially similar to the extra page read time.

25. The method of claim 18, wherein the set of multi-level NVM cells includes a quad level cell architecture.

* * * * *